Jan. 17, 1961     R. L. LICH     2,968,258

RAILWAY VEHICLE MOUNTING

Filed June 6, 1955     6 Sheets—Sheet 1

INVENTOR
RICHARD L. LICH
BY Rodney Bedell
ATTORNEY.

INVENTOR
RICHARD L. LICH
BY Rodney Bedell
ATTORNEY

INVENTOR
RICHARD L. LICH
By Rodney Bedell
ATTORNEY

Jan. 17, 1961 R. L. LICH 2,968,258
RAILWAY VEHICLE MOUNTING
Filed June 6, 1955 6 Sheets-Sheet 4

INVENTOR
RICHARD L. LICH
BY Rodney Bedell
ATTORNEY.

INVENTOR
RICHARD L. LICH
BY Rodney Bedell
ATTORNEY.

Jan. 17, 1961    R. L. LICH    2,968,258
RAILWAY VEHICLE MOUNTING
Filed June 6, 1955    6 Sheets-Sheet 6

INVENTOR
RICHARD L. LICH
BY Rodney Bedell
ATTORNEY

United States Patent Office 2,968,258
Patented Jan. 17, 1961

2,968,258

RAILWAY VEHICLE MOUNTING

Richard L. Lich, St. Louis, Mo., assignor to General Steel Castings Corporation, Granite City, Ill., a corporation of Delaware Filed June 6, 1955, Ser. No. 513,234

17 Claims. (Cl. 105—169)

The invention relates to railway rolling stock and more particularly to the support of a railway vehicle body on a truck by structure interconnecting the sides of the body and truck. The invention is adapted for use with body and truck structure in which the vehicle body has a center sill at approximately the level of the axes of the truck wheels and the truck frame is mounted upon the wheels by means of stub axles positioned at opposite sides of the body center sill.

Preferably the invention is embodied in a two wheel truck at each end of the vehicle body, the wheel axles being journaled in a drop axle frame with portions at the sides of the truck arched over the wheels and providing bearings at opposite sides of each wheel for a stub axle and also providing a spring seat outboard of the wheel and positioned substantially above the top of the wheel. Hangers are suspended from caps mounted on the truck springs and have supporting connections at their swinging ends to the sides of the vehicle body.

One object of the invention is to provide a light weight truck for yieldingly supporting a vehicle body with a low level center sill.

Another object is to provide for relative lateral movement between the vehicle body and the truck wheels to accommodate lateral thrusts encountered by the truck wheels and particularly thrusts resulting from the passage of the wheels between tangent and arcuate track sections.

Another object is to facilitate swiveling between the truck and the vehicle body on curved track but at the same time to avoid oscillation or shimmy between the truck and body on straight track.

Another object is to avoid the use of a center pin between the body and truck while holding the body and truck against relative longitudinal movement at the center line of the vehicle and at the same time provide for their necessary swiveling.

Another object is to adapt a truck and body assembly of the type referred to for use of air springs as well as conventional helical steel springs.

Another object is to stabilize a two wheel, or single wheel axis, truck against vertical tilting longitudinally of the vehicle without requiring the usual center plate or similar horizontal bearing device.

Another object is to apply body loads in the same planes longitudinally of the car as the axes of the springs so as to substantially eliminate the application of any lateral component of the body load to devices restraining lateral movements of the spring caps.

Another object is to couple together adjacent two wheel trucks under two vehicle bodies, arranged end to end, so as to form a four wheel truck on which both bodies will swivel and in which the spaced axles will be held against undesirable angular movement relative to each other.

These and other detailed objectives as will appear below are attained by the structures illustrated in the accompanying drawings described below. It is to be understood that the terms "longitudinal" and "transverse" relate to the longitudinal axis of the vehicle, unless otherwise specifically indicated, irrespective of the fact that the over-all dimension of the truck structure is greater transversely of the vehicle than lengthwise of the vehicle. In the drawings:

Figure 5 is a perspective of a linkage between the truck frame and vehicle body arranged to accommodate swiveling of the truck and body and to accommodate relative lateral and vertical movement of the truck and vehicle body, but at the same time maintain the truck parts stably upright and to hold the truck center against movement lengthwise of the body.

Figure 6 is a side elevation, substantially diagrammatic, of three vehicle bodies connected end to end and mounted on trucks of the structure referred to.

Figure 1:
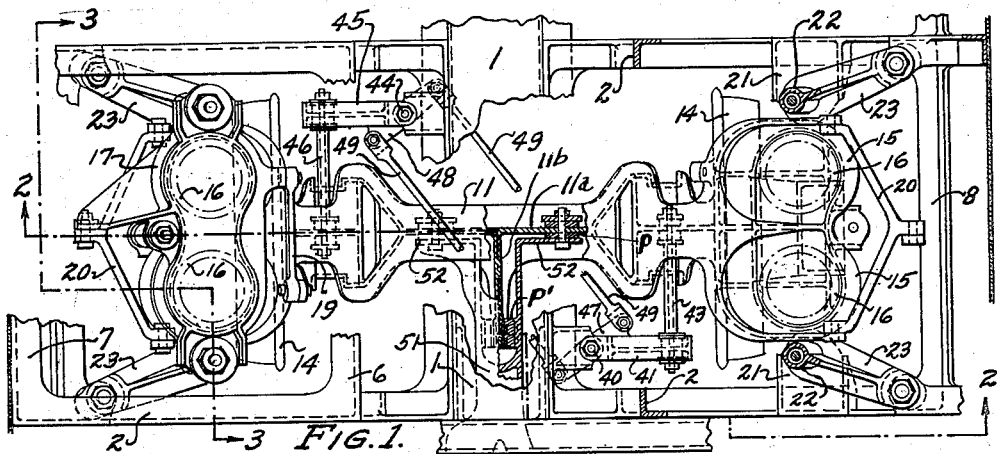
Figure 1 is in part a top view and in part a horizontal section through a truck and body assembly on line 1—1 of Figure 2.
Figure 8:
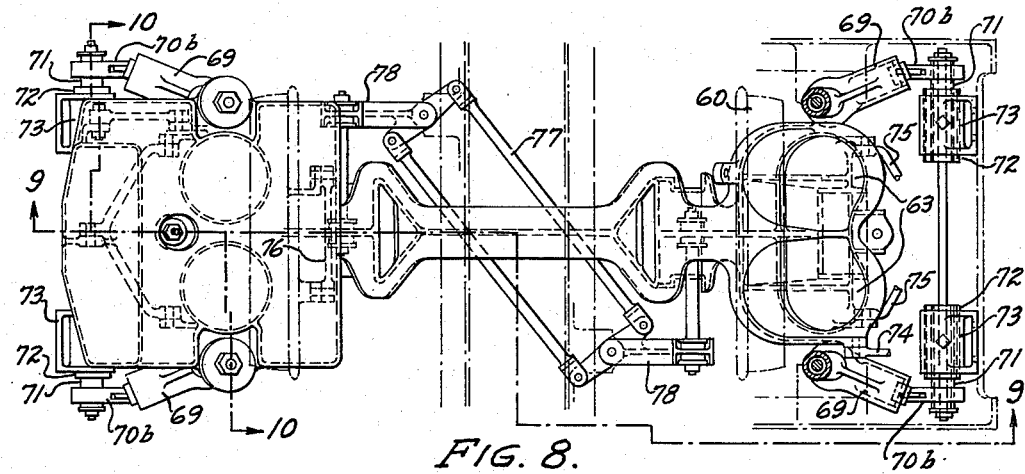

Figure 8 corresponds to Figure 1 but illustrates another form of the invention, in which the truck utilizes air springs instead of coil springs and the truck swing hangers support the sides of the vehicle body by elongated horizontal tubular rubber torsion springs instead of through rubber cushions and coil spring connections. Figure 8 is taken on line 8—8 of Figure 9.

Figure 2:
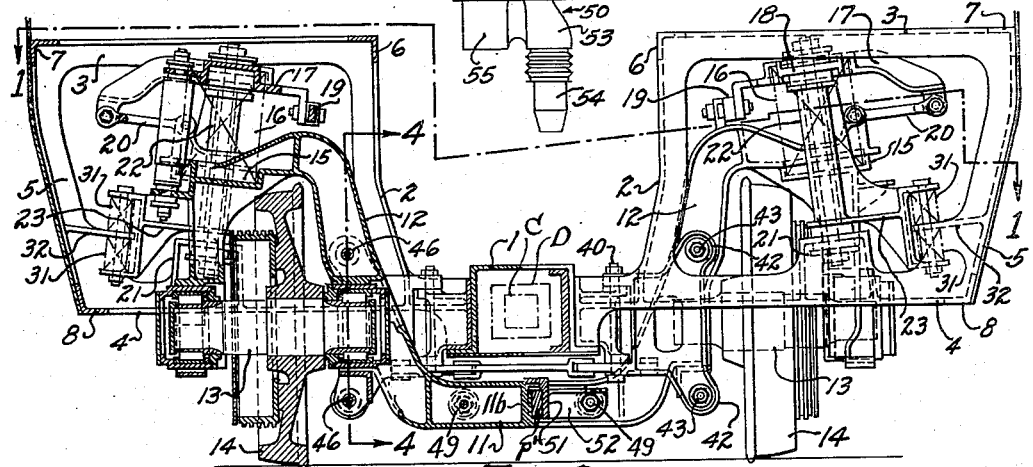
Figure 2 is a transverse vertical section and end view on line 2—2 of Figure 1.
Figure 9:
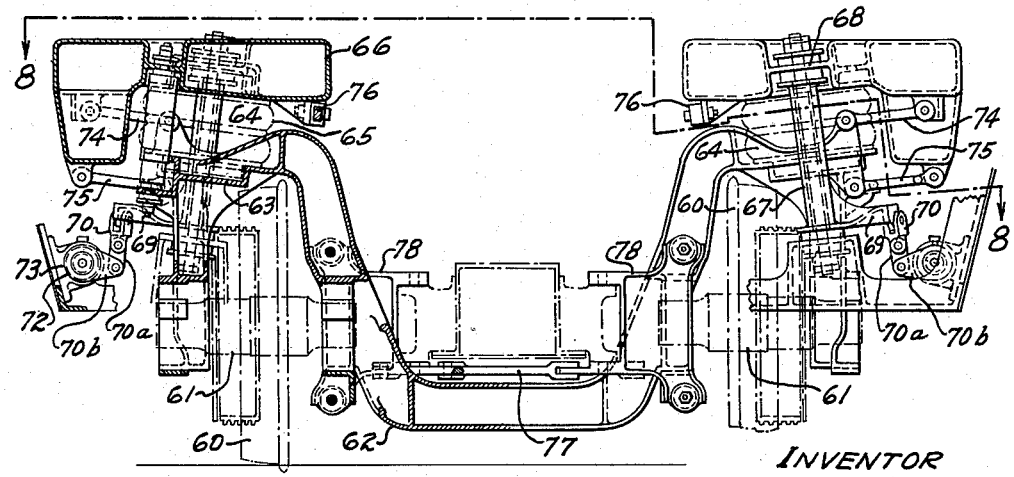

Figure 9 corresponds generally to Figure 2 but illustrates the structure of Figure 8 on line 9—9 of Figure 8.

Figures 3, 4:
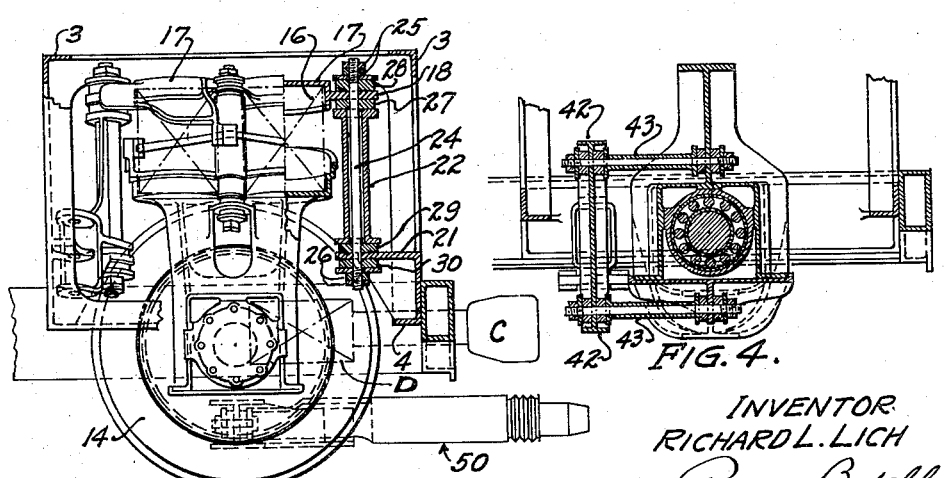
Figure 3 is a side view and longitudinal section on line 3—3 of Figure 1.
Figure 10:
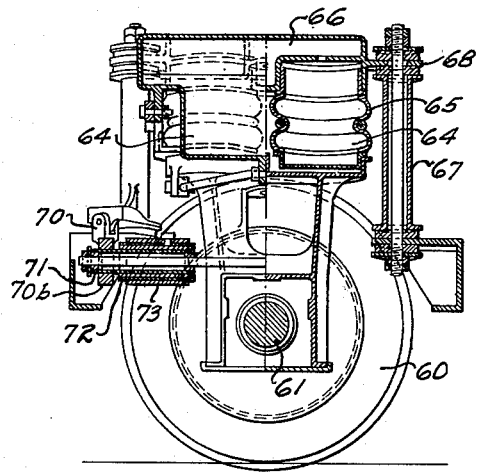

Figure 10 corresponds to Figure 3 but shows the structure of Figures 8 and 9 on line 10—10 of Figure 8.

Figure 11:
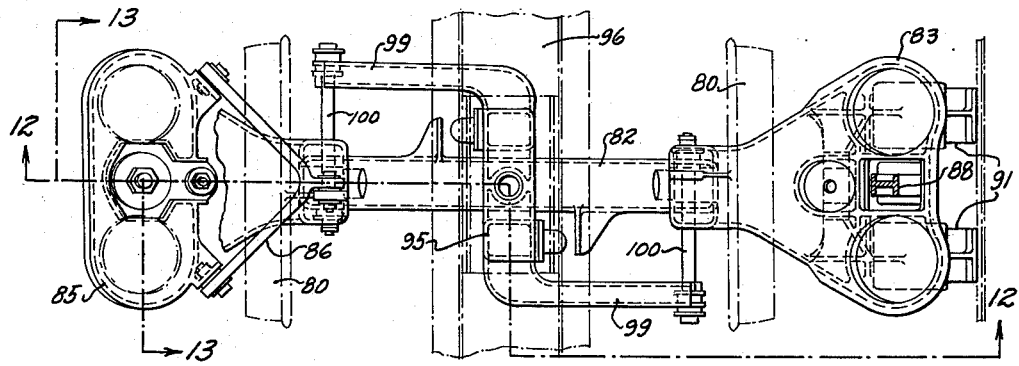

Figure 11 is a top view of structure embodying another form of the invention which includes a center pin connection between the truck frame and vehicle body center sill. The structure embodies air springs for mounting the body-supporting hangers and a single hanger is used at each side of the truck instead of spaced hangers, as in the forms previously described.

Figure 12:
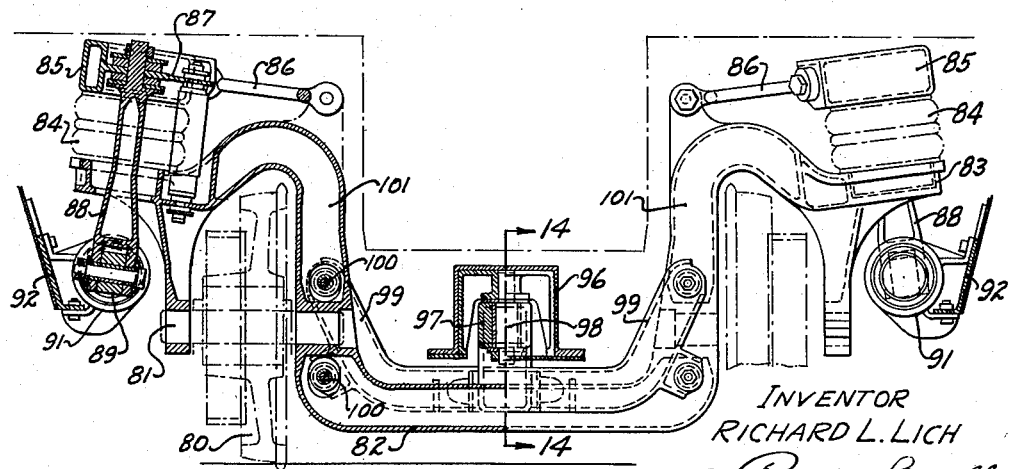

Figure 12 corresponds generally to Figures 2 and 9 but illustrates the structure shown in Figure 11 on line 12—12 of Figure 11.

Figures 13, 14:
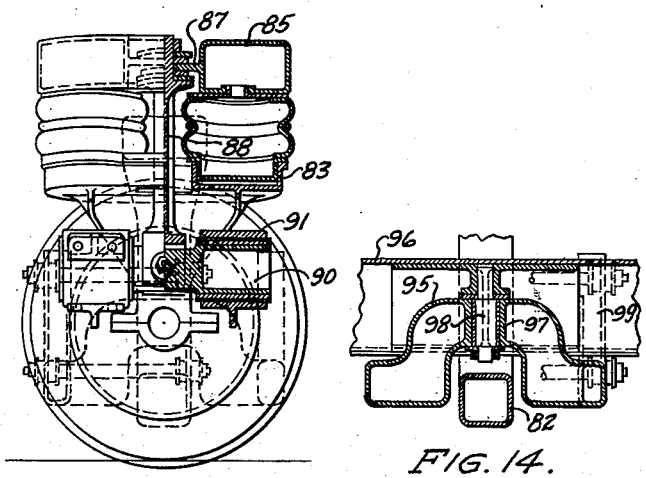

Figure 13 corresponds to Figures 3 and 10 but illustrates the structure shown in Figure 11 on line 13—13 of Figure 11.

Figure 14 is a longitudinal vertical section on line 14—14 of Figure 12.

Figure 15:
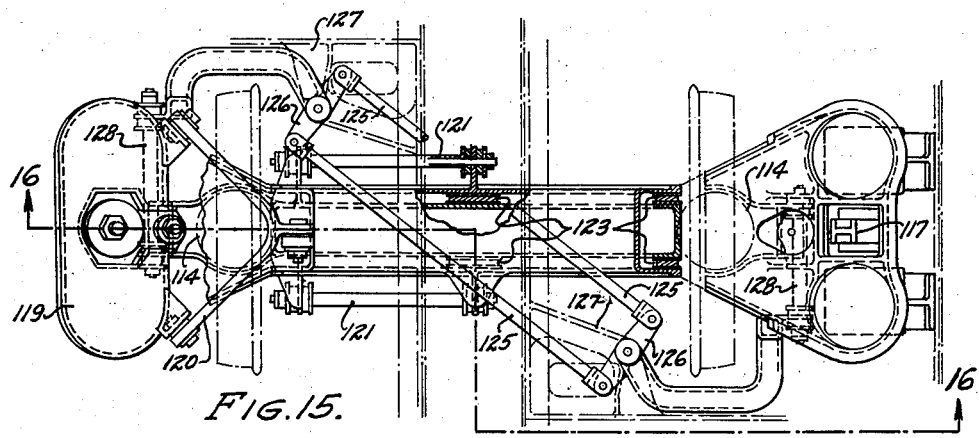

Figure 15 is a top view and horizontal section corresponding generally to Figures 1, 8, and 11 but illustrates another form of the invention, in which a truck bolster is spring supported upon the drop axle frame and mounts the truck springs which, in turn, support hangers connected to the sides of the vehicle body. The drawing is on line 15—15 of Figure 16.

Figure 16:
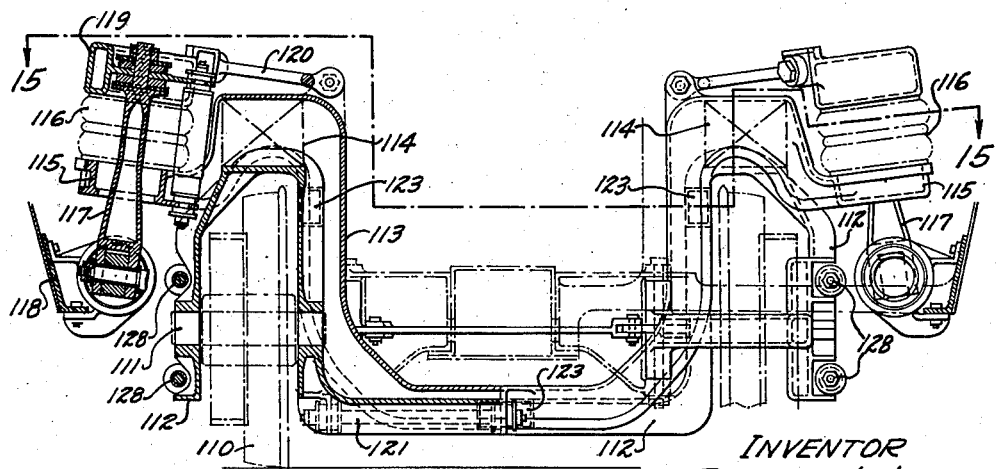

Figure 16 corresponds generally to Figures 2, 9 and 12, but illustrates the structure of Figure 15 approximately on line 16—16 of Figure 15.

Figure 17:
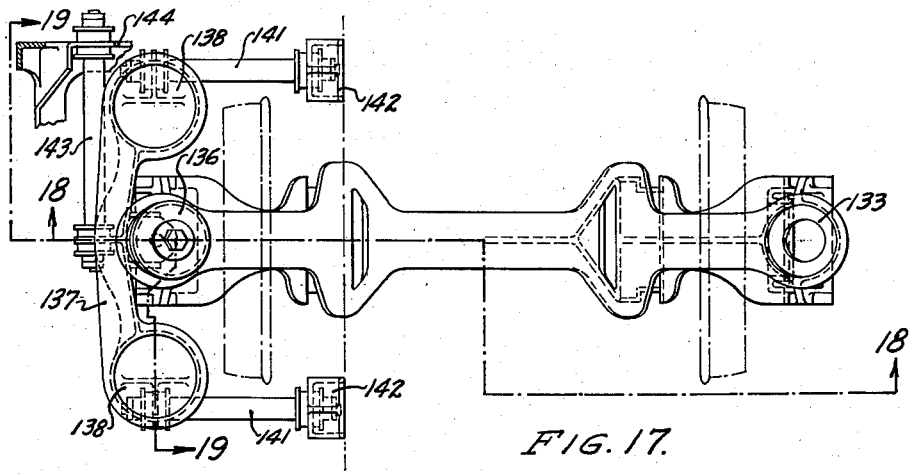

Figure 17 is a top view of structure embodying another form of the invention in which the swing hangers suspended from the truck springs support a longitudinally extending spring seat mounting a plurality of auxiliary springs with hangers supportingly connected to the sides of the vehicle body.

Figure 18:
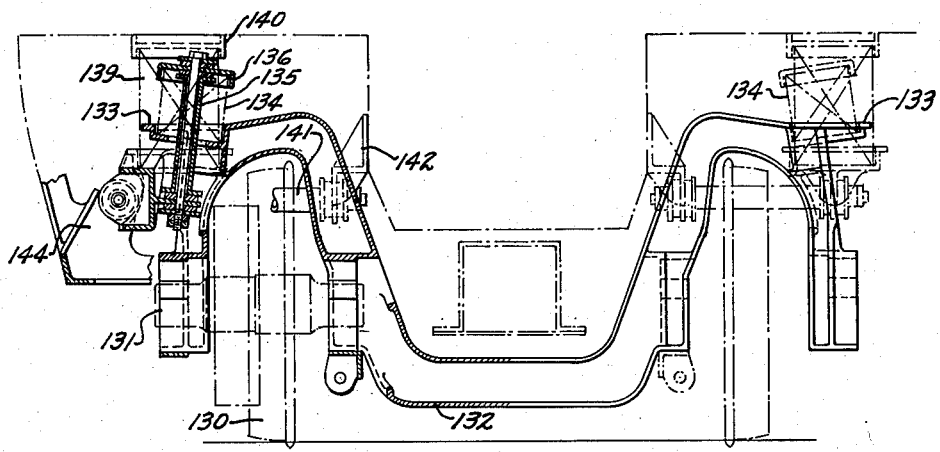

Figure 18 is a vertical transverse section and view on line 18—18 of Figure 17.

Figure 19:
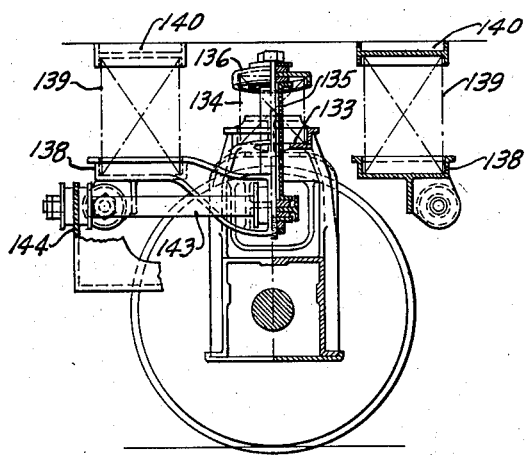

Figure 19 is a side view and vertical section on line 19—19 of Figure 17.

In the first structure shown in Figures 1–7, the vehicle body underframe includes a continuous box-like center sill 1, there being upwardly extending underframe members 2, spaced apart lengthwise of the body, and outwardly extending transverse upper and lower members 3 and 4, respectively, connected at their outer ends by upright members 5. Transverse frame members 2, 3, 4, and 5 are interconnected by continuous longitudinals 6, 7, and 8.

Each truck includes a drop axle frame, having a low level transverse portion 11 and inverted U-shaped sides 12 mounted on stub axles 13 with wheels 14. Spring seats 15 project from the upper portions of the sides of the frame and are slightly inclined from the horizontal. Helical coil springs 16 are mounted on each axle frame spring seat 15 and in turn support a spring cap 17 terminating at its outer ends in flanges 18. As a result of the inclination of the spring seats, the axes of springs 16 are slightly inwardly inclined. Spring caps 17 are held against non-vertical movement relative to the frame by longitudinal anchors 19 and by transverse anchors 20 extending between the spring caps and brackets on the truck frame.

Swing hangers are suspended from spring cap flanges 18 and at their lower portions have supporting connections to brackets 21 on the vehicle body underframe. As on conventional trucks, the swing hangers are inclined downwardly and outwardly of the truck. The angle of inclination of the hangers is substantially equal to that of springs 16, so that all body loads are normally applied in the same longitudinal planes as the axes of the springs, and the anchors 20 are thereby normally relieved of any lateral components of the body loads. Each hanger comprises a relatively long upright tubular leg 22 and a relatively short horizontal lower arm 23 bifurcated vertically at its outer end. Hence the hanger is a general L-shaped bell crank member. A rod 24 extends through tubular leg 22, spring cap flange 18 and underframe bracket 21 and is threaded at its upper end for nuts 25 and at its lower end for nuts 26. Between the upper end of leg 22 and the underside of flange 18 is a rubber pad 27. Between the upper side of flange 18 and nuts 25 is a rubber pad 28. Between the lower end of leg 22 and underframe bracket 21 is a rubber pad 29. Between the bracket and nuts 26 is a rubber pad 30. Coil springs 31 are inserted between the bifurcations of hanger arm 23 and a bracket 32 on the body underframe.

Accordingly, the hangers have in effect universal joint connections to the spring caps and to the body underframe so that the hangers may swing in any direction to accommodate relatively swiveling and transverse movements between the truck and body underframe. Any departure of the underframe from its normal position due to the swinging of the hangers is resisted by the distortion of rubber pads 27, 28, 29, 30, and springs 31 and by elevating the suspended elements against the force of gravity. Hence the distorted pads and gravity urge the truck and body towards the normal position shown in the drawings.

Figure 5:
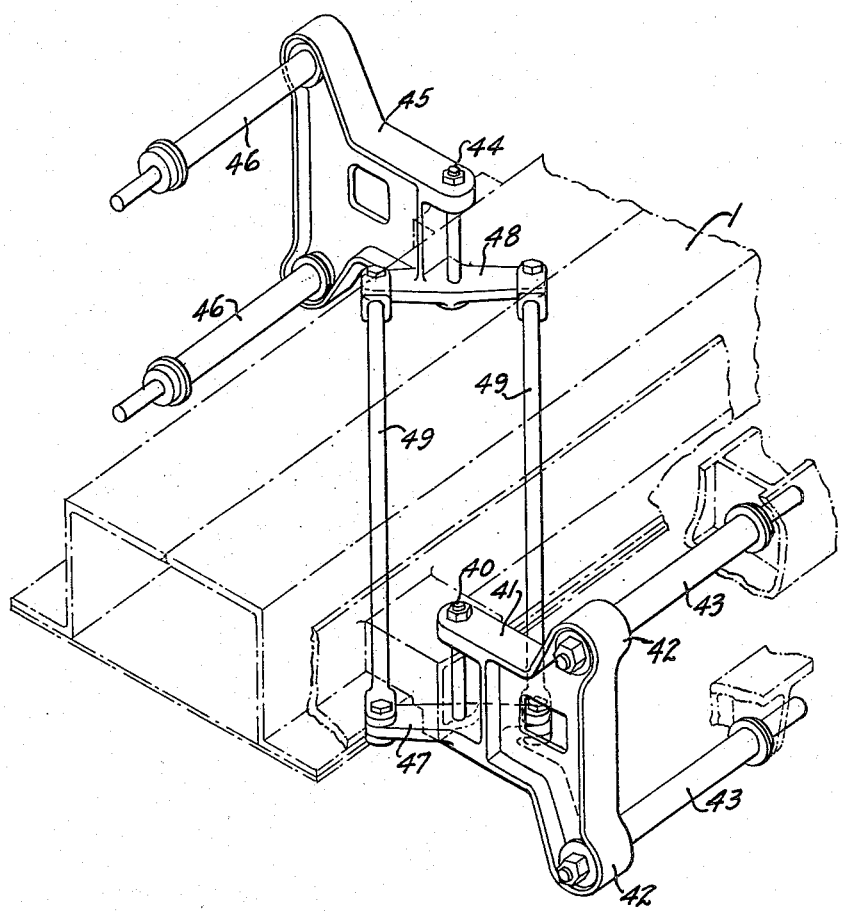
Figure 5 is a detailed vertical longitudinal section on line 4—4 of Figure 2.
Figure 6:
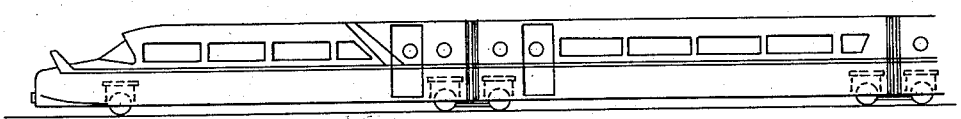
Figure 7:
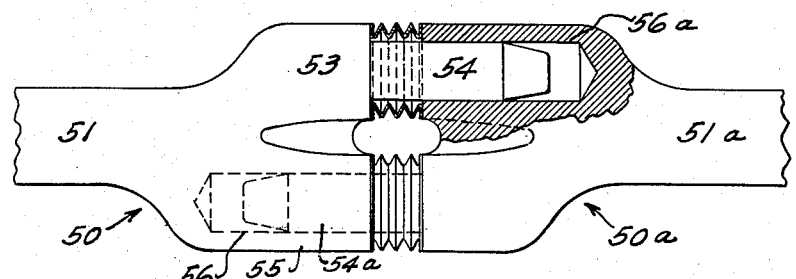
Figure 7 is a detail of a truck coupler connection between adjacent trucks of two of the interconnected vehicle bodies shown in Figure 6.

Figure 5 illustrates a structure used in place of the usual center pin connection between vehicle body and truck to prevent longitudinal displacement of the truck center relative to the body and, at the same time, to accommodate relative swiveling lateral and vertical movements between the vehicle body and the truck and to resist torque reaction in a longitudinal vertical plane.

Pivoted to center sill 1 at 40 between the truck frame and the end of the vehicle is a yoke 41 having upper and lower ears 42, connected to the corresponding truck frame part 12 by anchors 43 extending lengthwise of the vehicle. Pivoted at 44 to the opposite side of the center sill is a similar yoke 45 connected by anchors 46 to the corresponding truck frame part 12. Each yoke 41, 45 includes a rigid arm 47, 48 respectively extending diagonally of the center sill. The outer ends of each arm are pivotally connected to the outer ends of the other arm by links 49 extending diagonally of the center sill at right angles to arms 47, 48.

With this linkage, the truck is free to swivel relative to the body and also to move laterally and vertically of the body due to the play of anchors 43, 46 but is held against vertical tilting, all torque reaction in a longitudinal vertical plane being taken through the anchors. The truck springs and hangers are not loaded unevenly by a tendency of the truck frame to tilt about the wheel axles, which would otherwise exist.

Each anchor 19, 20, 43, 46 is of a type generally used in spacing railway truck parts and consists of tubular body struts surrounding a rod having collars at its opposite ends with rubber pads clamped between the vehicle body to which it is applied and the adjacent ends of the strut and rod.

The two wheel truck described comprises a self-contained unit which may mount one end of a vehicle body. When adjacent vehicle bodies are coupled together by the usual draft gear D and couplers C (Figure 3) mounted on the body framing, there may be considerable angular play between the two adjacent truck frames and the riding characteristics of the coupled bodies may be improved if similar angular coupler play between the trucks is eliminated. For this purpose, each truck may be provided with a truck coupling device adapted to cooperate with a corresponding coupling device on the other truck. This device is shown generally at 50 (Figures 1, 7) and includes a body 51 elongated lengthwise of the truck with its inner end provided with spaced flanges 52, extending transversely of the truck and seated through rubber pads P against the upright wall 11a of the truck transverse frame portion 11. Portion 11 includes a forwardly extending bracket 11b which supports rubber pads P', supporting the forward portion of coupling body 51. Pads P yield under compression applied longitudinally of the coupling device and pads P' yield under shear applied vertically of the device to accommodate necessary vertical tilting of the coupling device. This yielding of pads P, P' will accommodate relative tilting of the adjacent car bodies in a vertical longitudinal plane as may result from track inequalities. The outer end of body 51 is bifurcated transversely of the truck with one long bifurcation 53 terminating in a reduced-diameter extension 54 and the other short bifurcation 55 having a socket 56 corresponding in diameter to the diameter of extension 54 and adapted to receive a corresponding extension 54a on the adjacent truck. A bellows-like flexible sleeve surrounds the inner portion of each extension 54, 54a and forms a dust seal with the opposing end of the socket 56a, 56 respectively, to avoid undue wear on the peripheries of the associated parts as they slide over each other.

The two devices 50, 50a are slidable on each other lengthwise but hold their respective truck frames against relative angular movement and thereby contribute to the uniform movements of the adjacent ends of the vehicle bodies.

In the second structure shown in Figures 8, 9, and 10, the truck wheel 60, axle 61, and frame 62 assembly corresponds generally to that previously described and the frame similarly includes spring seats 63 positioned above the level of the tops of the wheels and each supporting a pair of springs 64 disposed forwardly and rearwardly of the transverse center line of the truck. These springs are of the air spring type in which their upper and lower plate-like ends are connected by a flexible side wall 65 forming a bellows-like compartment. The springs offer yielding resistance to distortion by the compression and expansion of the air confined in them in response to increasing and decreasing loads. The springs are interconnected so that they act as a unit and this interconnection is embodied in the spring cap 66, which is shown as a hollow box-like structure of substantial volume and forming a surge chamber for the air springs.

A hanger 67 is suspended from a bracket 68 at each end of spring cap 66 and the lower ends of these hangers directly support the body as previously described and have arms 69 which are connected by clevis-like links 70 and straight links 70a to arms 70b on the inner members 71 of tubular torsion springs, the outer members 72 of which are secured to the housings 73 mounted on the adjacent side frame elements of the vehicle body. Elements 70, 70a, 70b, 71 and 73 yieldingly resist the relative movement of the lower ends of hangers 67 transversely of the hanger axis and therefore yieldingly resist relative movement of the truck frame and vehicle body supported therefrom. Spring caps 66 are stabilized by link connections 74 and 75 and 76 to the truck frame. The swiveling of the truck on the body underframe without displacement of the truck center relative to the body is controlled by a diagonal anchorage 77 and leverage 78 best shown in Figure 8 and corresponding to that of Figure 5 previously described.

The third structure shown in Figures 11–14 embodies the wheels 80, axle 81, and frame 82 assembly similar to those previously described and the frame includes spring seats 83 for air springs 84 supporting spring caps 85 pivotally connected to the truck frame by links 86. The spring cap has a bracket 87 intermediate the ends of which a single hanger 88 is suspended. The lower end of hanger 88 is forked and pivotally supports a bar 89 extending lengthwise of the truck with its ends forming the inner cylindrical members 90 of a tubular torsion spring, the outer members 91 of which are affixed to the lower side framing 92 of the vehicle body.

The single hanger at each side of the truck provides, in effect, a universal pivotal connection between the truck and the vehicle body and facilitates the desired relative movements of these parts.

The anchorage between the truck frame and the vehicle body includes a Z-shaped rigid member (Figure 11), the central portion 95 of which extends below the body center sill 96 and has an upstanding central cylindrical boss 97 received in the center sill and pivoted thereto by a pin 98. The end arms 99 of the Z are inclined upwardly (Figure 12) and have vertically spaced links 100 attached to corresponding portions 101 of the truck frame.

In the fourth structure shown in Figures 15 and 16, the wheel 110, axle 111, and frame 112 assembly corresponds to those previously described but a supplemental frame or bolster 113 extends transversely of the truck substantially parallel to and above frame 112 and is supported from the latter by coil springs 114. Bolster 113 is of channel shape in cross section and receives truck frame 112 between its flanges. The outer ends of bolster 113 are offset downwardly to form seats 115 for air springs 116 corresponding to those shown in Figures 11–13 and similarly supporting a single swing hanger 117 at each side of the truck which is connected to the vehicle body framing 118 by tubular torsion springs as previously described. The spring cap 119 is anchored by links 120 to bolster 113 and the bolster is anchored to truck frame 112 by transverse links 121. These links are of the type with central rods, tubular struts, and yielding pads, between which the interconnected parts are clamped. Movement of bolster 113 longitudinally and transversely of truck frame 112 is restrained by rubber pads 123 or the like between opposing faces of their upright legs.

The swiveling anchorage device includes rods 125, corresponding to those previously described, and connection levers 126, which levers are fulcrumed on body frame members 127, the outer ends of which are connected by longitudinal anchors 128 to the corresponding outer portions of truck frame 112.

The fifth arrangement shown in Figures 17–19 includes a wheel 130, axle 131, and frame 132 assembly similar to that previously described and each outer end of the truck frame forms a single spring seat 133 for a coil spring 134. The single hanger 135, suspended from spring cap 136, supports a longitudinally extending beam 137 having spring seats 138 at its ends. Coil springs 139 are mounted on seats 138 and yieldingly mount the vehicle body framing at 140. The assembly is stabilized by transverse anchors 141 between spring seat member 138 and brackets 142 on the vehicle body frame and by anchors 143 between the intermediate portion of member 137 and brackets 144 on the body frame. Pivoting of truck and body is as previously described for the bodies and trucks of Figures 1–14.

In each of the structures illustrated, the body supporting springs are above the level of the axle journals and are either in line with the vertical transverse plane of the wheel axes or are close to the same and are at such height relative to the wheels that the relatively large diameter springs may be utilized to provide soft, easy riding characteristics. In order that no lateral component of the body load be normally applied to the spring cap lateral anchors, the inclination of the spring axes is substantially the same as the inclination of the swing hangers transversely of the car body. The connections between the axles frames, the spring seats, the hangers, and the vehicle body promote flexible assembly and a smooth, fluid mounting of the body upon the truck. It will be understood that various types of steering mechanisms may be used in connection with each of the trucks illustrated, but that since steering mechanisms do not form a part of this invention, neither they, nor their manner of attachment to the trucks, is shown.

The different spring arrangements make possible use of springs of different types at different points of supports, thus making possible the selection of springs according to their respective individual merits for different spring actions.

The combinations of springs and the details of their mountings and the connections between the axle of the truck frame and the vehicle body may be varied substantially without departing from the spirit of the invention and the exclusive use of those modifications coming within the scope of the claims is contemplated.

What is claimed is:

1. In a truck for mounting a railway vehicle body, a truck frame, wheels journaled in said frame at opposite sides of the truck and having a common axis in fixed relation to the frame, a spring unit outboard of each wheel and supported from the frame and positioned above the level of the wheel axes, hangers at the sides of the truck pivotally suspended from said spring units, elements carried by swinging portions of said hangers and constructed and arranged for supporting connection to the sides of a vehicle body and mechanism for swiveling the truck about a central vertical axis upon the vehicle body comprising lever structure extending generally diagonally across the truck and fore and aft of the wheel axis and having elements for pivotal connection to the vehicle body, there being parallel anchors extending lengthwise of the truck near opposite sides of the truck and each connected at its opposite ends respectively to the adjacent side of the truck frame and to the adjacent end portion of said lever structure.

2. A truck according to claim 1 in which the hangers at the sides of the truck are in the same general transverse upright plane as the transverse center line of the truck frame.

3. A truck according to claim 2 in which the spring units comprise a plurality of air containing compartments with flexible side walls and a hollow air receiving spring cap connected to the compartments and forming a surge chamber.

4. A truck according to claim 1 in which the spring unit at each side of the truck includes yielding devices spaced apart forwardly and rearwardly of the upright transverse center line of the truck and each body supporting hanger is suspended from the spring units intermediate the associated spring unit parts.

5. A truck according to claim 1 in which the elements carried by the swinging ends of the hangers for supporting connection to the sides of a vehicle body includes an elongated bar extending lengthwise of the truck fore and aft the hangers with car body engaging elements at its ends.

6. A truck according to claim 1 in which the parallel anchors near opposite sides of the truck are formed in pairs of vertically spaced anchors and their connections to the truck frame and the lever structure are pivotal and accommodate shifting of the truck and vehicle body vertically, transversely and lengthwise of the truck without affecting the swiveling of the body and truck about the central vertical axis.

7. In a truck for mounting a railway vehicle body, a transverse frame, wheels journaled in said frame at opposite sides of the truck and having a common axis in fixed relation to the frame, seats on said frame above the level of said axis and projecting outboard of the wheels, spring units mounted on said seats and centered about the general vertical plane of the common axis of said wheels, swing hangers suspended from said spring units, the axes of said swing hangers and spring units at the same side of the truck being positioned in substantially the same plane inclined from the vertical transversely of the truck, and elements on swinging portions of said hangers constructed and arranged for supporting connection to the sides of a vehicle body and yieldable to accommodate relative movement of the hangers and a vehicle body transversely of the truck.

8. A truck according to claim 7 in which the spring unit at each side of the transverse frame includes an air containing compartment with flexible side walls and vertically spaced top and bottom members movable towards and from each other by the compression and expansion of the air in said chamber.

9. In a truck for mounting a railway vehicle body, a truck frame extending from side to side of the truck, a wheel journaled in said frame at each side of the truck, springs at opposite sides of the truck supported from said frame, caps on said springs, a pair of swing hangers suspended from each of said spring caps and spaced apart lengthwise of the truck, said hangers comprising substantially upright legs suspended from their upper ends, and substantially horizontal arms rigid with the lower ends of said legs, the lower ends of said hanger legs having elements for supporting connection to the side of a vehicle body, which elements yield to accommodate movement between supporting and supported parts which they connect and to accommodate relative lateral movement of the body and truck, said horizontal arms diverging outwardly of the truck and provided with vertically yielding devices for connection to the side of a vehicle body to resist the relative movement of said elements.

10. A railway truck according to claim 9 in which the yielding devices at the outer ends of the horizontal arms at the lower ends of the hangers comprise torsion springs having their axes arranged lengthwise of the truck and each connected at one end to the horizontal arm and at the other end having elements for connection to the vehicle body.

11. In a truck for mounting a railway vehicle body, a truck frame extending from side to side of the truck, a wheel journaled in said frame at each side of the truck, springs at opposite sides of the truck supported from said frame, caps on said springs, a pair of swing hangers suspended from each of said spring caps and spaced apart lengthwise of the truck, said hangers comprising substantially upright legs, suspended from their upper ends and provided at their lower ends with body connecting elements whereby the hangers support the body, said elements yielding to accommodate relative lateral movement of the body and truck, and provided with substantially horizontal arms rigid with the lower ends of said legs, said horizontal arms diverging outwardly of the truck and provided with vertically spaced brackets and vertically yielding springs seated thereon for engagement with a horizontal portion of a vehicle body to limit the yielding of said elements.

12. In a truck for mounting a railway vehicle body, a truck frame, wheels and axles mounting the same, springs and spring carried swing hangers supported from the sides of the truck frame, the hangers having elements for supporting connection to the sides of a vehicle body, and means for holding the truck frame against movement as a unit lengthwise of the center line of a vehicle body mounted thereon, said means comprising rigid lever members positioned near opposite sides of the truck frame and extending transversely of the truck but spaced from the truck frame respectively forwardly and rearwardly of the truck, an elongated anchorage extending horizontally longitudinally of the truck and pivotally connecting the outer end of each of said lever members to the adjacent portion of the truck frame, and linkage extending diagonally of the truck and pivotally connected at its opposite ends, respectively, to the inner ends of said lever members, there being a vertical pivot element at the inner end of each of said lever members constructed and arranged for connection to a vehicle body, said pivot elements being spaced apart a substantial distance transversely of the truck.

13. Railway truck structure according to claim 12 in which the linkage extending diagonally of the truck comprises parallel horizontal elongated rods spaced apart horizontally and having individual pivot connections to the lever member, and the vertical pivot element at the inner end of each lever member is positioned intermediate the corresponding pivotal connections of said rods to said lever member.

14. In a truck for mounting a railway vehicle body, a truck frame, wheels and axles mounting the same, springs and spring carried swing hangers supported from the sides of the truck frame, the hangers having elements for supporting connection to the sides of a vehicle body, and means for holding the truck frame against movement as a unit lengthwise of the center line of a vehicle body mounted thereon, said means comprising rigid lever members positioned near opposite sides of the truck frame, each lever member comprising an arm elongated vertically with vertically spaced axially aligned pivot elements, adapted for connection to a vehicle body center sill, and an arm elongated horizontally, elongated linkage pivotally connecting the upper and lower portion of said vertically elongated arm to the adjacent portions of the truck frame, and elongated linkage pivotally connecting the ends of said horizontally elongated arm to the corresponding arm of the other lever.

15. A railway truck structure according to claim 14 in which the outer end of each lever member is extended vertically and the elongated linkage pivotally connecting the outer ends of each lever member to the adjacent portion of the truck frame comprises vertically spaced units attached respectively to the upper and lower portions of said lever member outer ends and to the truck frame, whereby the truck frame is held against tilting longitudinally of the truck when the inner ends of the lever members are attached to a car underframe.

16. In a two wheel truck for mounting one end of a railway vehicle body, wheels at opposite sides of the truck having aligned individual axles, a truck frame rigid from side to side of the truck and supported on said axles, spring seats carried by the truck frame and centered about the vertical plane extending transversely of the truck through the axis of said axles, upstanding spring units mounted on said seats and extending upwardly therefrom, swing hangers suspended from said units, the axes of said swing hangers and spring units being inclined downwardly and outwardly of the truck at substantially the same angle and lying in substantially the same plane, and elements of the swinging portions of said hangers constructed and arranged for pivotal supporting connection to the sides of a vehicle body mounted on the truck.

17. In a vehicle body and truck assembly, a body longitudinal central framing member, a truck frame extending transversely of said member, wheels individually journaled in said frame at opposite sides of the truck, swing hangers suspended from said frame and supporting the sides of the body, a lever at each side of the central framing member and having an upright pivot connection intermediate its ends to said member and extending from said connection toward and away from the longitudinal center line of said assembly, an elongated anchor for each lever extending lengthwise of the vehicle and connected at one end to a part of the lever spaced outboard of the lever's pivot connection to said member and connected at its other end to the adjacent portion of the truck frame, and linkage extending diagonally of said member and directly connecting the inner and outer ends respectively of one lever to the outer and inner ends of the other lever.

References Cited in the file of this patent

UNITED STATES PATENTS

| | | |
|---|---|---|
| 209,093 | Weaver | Oct. 15, 1878 |
| 1,096,367 | Head | May 12, 1914 |
| 1,348,991 | Gilpin | Aug. 10, 1920 |
| 1,888,989 | Kratky | Nov. 29, 1932 |
| 2,042,623 | Oster | June 2, 1936 |
| 2,102,907 | Mylius | Dec. 21, 1937 |
| 2,190,728 | Mohun et al. | Feb. 20, 1940 |
| 2,357,081 | Cain | Aug. 29, 1944 |
| 2,647,470 | MacVeigh | Aug. 4, 1953 |